US010579793B2

(12) United States Patent
Lerner

(10) Patent No.: US 10,579,793 B2
(45) Date of Patent: Mar. 3, 2020

(54) MANAGED SECURITIZED CONTAINERS AND CONTAINER COMMUNICATIONS

(71) Applicant: Daniel Maurice Lerner, Missouri City, TX (US)

(72) Inventor: Daniel Maurice Lerner, Missouri City, TX (US)

(*) Notice: Subject to any disclaimer, the term of this patent is extended or adjusted under 35 U.S.C. 154(b) by 0 days.

(21) Appl. No.: 16/221,041

(22) Filed: Dec. 14, 2018

(65) Prior Publication Data

US 2019/0260716 A1 Aug. 22, 2019

Related U.S. Application Data

(63) Continuation of application No. 16/173,091, filed on Oct. 29, 2018, which is a continuation of application No. 16/005,040, filed on Jun. 11, 2018, now Pat. No. 10,154,021, application No. 16/221,041, which is a continuation of application No. 16/173,384, filed on Oct. 29, 2018, which is a continuation of application No. 16/006,011, filed on Jun. 12, 2018, now Pat. No. 10,158,613.

(60) Provisional application No. 62/610,827, filed on Dec. 27, 2017, provisional application No. 62/518,281, filed on Jun. 12, 2017, provisional application No. 62/540,352, filed on Aug. 2, 2017.

(51) Int. Cl.
*G06F 21/53* (2013.01)
*H04L 29/06* (2006.01)
*H04L 9/14* (2006.01)

(52) U.S. Cl.
CPC ............ *G06F 21/53* (2013.01); *H04L 9/14* (2013.01); *H04L 63/0428* (2013.01); *H04L 63/08* (2013.01)

(58) Field of Classification Search
CPC ..................................................... G06F 21/53
See application file for complete search history.

(56) References Cited

U.S. PATENT DOCUMENTS

| 4,200,770 | A | 4/1980 | Hellman et al. |
|---|---|---|---|
| 4,218,582 | A | 8/1980 | Hellman et al. |
| 4,405,829 | A | 9/1983 | Rivest et al. |
| 4,424,414 | A | 1/1984 | Hellmn et al. |
| 4,578,530 | A | 3/1986 | Zeidler |

(Continued)

FOREIGN PATENT DOCUMENTS

WO 2017/111843 A1 6/2017

OTHER PUBLICATIONS

Syed et al.; The software container pattern; Published in: Proceeding PLoP '15 Proceedings of the 22nd Conference on Pattern Languages of Programs; Article No. 15; Pittsburgh, Pennsylvania—Oct. 24-26, 2015; ACM Digital Library (Year: 2015).*

(Continued)

*Primary Examiner* — Bradley W Holder
(74) *Attorney, Agent, or Firm* — ePatentManager; Guerry L. Grune

(57) ABSTRACT

This disclosure provides for the securitization and/or encryption of software container devices that utilize both a control plane and a trust plane for ensuring that communication signals transmitted from and data residing within these containers are not corruptible. In addition, processors for monitoring statistics regarding data at rest and data on the move associated with creating these secure containers are also included.

25 Claims, 4 Drawing Sheets

(56) References Cited

U.S. PATENT DOCUMENTS

| | | | |
|---|---|---|---|
| 5,214,703 A | 5/1993 | Massey et al. | |
| 5,675,653 A | 10/1997 | Nelson, Jr. | |
| 5,825,890 A | 10/1998 | Elgamal et al. | |
| 6,157,722 A | 12/2000 | Lerner et al. | |
| 6,466,780 B1 | 10/2002 | Geiselman et al. | |
| 6,766,161 B2 | 7/2004 | Geiselman et al. | |
| 6,959,086 B2 | 10/2005 | Ober et al. | |
| 7,181,016 B2 | 2/2007 | Cross et al. | |
| 7,382,883 B2 | 6/2008 | Cross et al. | |
| 8,462,955 B2 | 6/2013 | Ureche et al. | |
| 8,825,999 B2 | 9/2014 | Mohamed | |
| 9,094,191 B2 | 7/2015 | Avanzi et al. | |
| 9,213,858 B2 | 12/2015 | Sharma et al. | |
| 9,465,953 B2 | 10/2016 | Shasrma et al. | |
| 9,521,123 B2 | 12/2016 | Jueneman et al. | |
| 9,703,985 B1 | 7/2017 | Sanchez | |
| 10,154,015 B1 | 12/2018 | Lerner | |
| 10,154,016 B1 | 12/2018 | Lerner | |
| 10,154,021 B1 | 12/2018 | Lerner | |
| 10,154,031 B1 | 12/2018 | Lerner | |
| 10,158,613 B1 | 12/2018 | Lerner | |
| 10,171,435 B1 | 1/2019 | Lerner | |
| 10,171,444 B1 | 1/2019 | Lerner | |
| 2001/0042043 A1* | 11/2001 | Shear | G06F 21/10 705/51 |
| 2006/0206397 A1* | 9/2006 | Shear | G06F 21/10 705/28 |
| 2009/0323941 A1* | 12/2009 | Sahita | G06F 21/53 380/44 |
| 2010/0174652 A1* | 7/2010 | Shear | G06F 21/10 705/53 |
| 2012/0198538 A1 | 8/2012 | Spring et al. | |
| 2016/0050272 A1* | 2/2016 | Raduchel | H04L 67/1095 709/204 |
| 2016/0217303 A1* | 7/2016 | Kasper | H04L 63/061 |
| 2016/0342786 A1* | 11/2016 | Gerebe | G06F 21/52 |
| 2017/0012642 A1 | 1/2017 | Declercq et al. | |
| 2017/0090800 A1* | 3/2017 | Alexandrovich | G06F 3/0622 |
| 2018/0167217 A1* | 6/2018 | Brady | H04L 9/3247 |
| 2018/0173502 A1* | 6/2018 | Biskup | G06F 8/30 |
| 2018/0205708 A1* | 7/2018 | Kurian | G06F 21/32 |
| 2018/0349610 A1 | 12/2018 | Gupta et al. | |
| 2019/0213319 A1* | 7/2019 | Gerebe | G06F 21/44 |
| 2019/0251278 A1* | 8/2019 | Kalinichenko | G06F 21/6218 |

OTHER PUBLICATIONS

Barlev et al.; Secure yet usable: Protecting servers and Linux containers; Published in: IBM Journal of Research and Development (vol. 60 , Issue: 4 , Jul.-Aug. 2016 ); pp. 12:1-12:10; Date of Publication: Jul. 27, 2016; IEEE Xplore (Year: 2016).*

Aleksandrov, V. International Search Report. Federal Institute of Industrial Property. ISA/RU. Form PCT/ISA/210. Box A-C, dated Apr. 11, 2019, Moscow, Russia.

Aleksandrov, V. Written Opinion of the International Searching Authority. Federal Institute of Industrial Property. ISA/RU. Form PCT/IS/237. Box No. V and Supplemental Box, dated Apr. 11, 2019, Moscow, Russia.

* cited by examiner

MANAGED SECURITIZED CONTAINERS AND CONTAINER COMMUNICATIONS

This application is a nonprovisional conversion of and takes priority from U.S. Provisional Application No. 62/610,827 entitled "Managed Securitized and Encrypted Containers and Container Communications" filed Dec. 27, 2017.

This application is also a continuation of U.S. application Ser. No. 16/173,091 filed Oct. 29, 2018, which is a continuation of U.S. Nonprovisional application Ser. No. 16/005,040 filed Jun. 11, 2018 entitled "Securitization of Temporal Digital Communications with Authentication and Validation of User and Access Devices", now granted as U.S. Pat. No. 10,154,021 on Dec. 11, 2018, which is a nonprovisional conversion of US Provisional Application entitled "A System for Securing and Encrypting Temporal Digital Communications with Authentication and Validation of User and Access Devices" with Ser. No. 62/518,281 filed Jun. 12, 2017.

In addition, this application is also a continuation of and takes priority under 35 USC § 120 of U.S. patent application Ser. No. 16/173,384, filed Oct. 29, 2018, which is a continuation of application Ser. No. 16/006,011, filed Jun. 12, 2018, granted as U.S. Pat. No. 10,158,613 on Dec. 18, 2018, which is a nonprovisional conversion of and takes priority under 119(e) of U.S. Provisional Application No. 62/540,352, entitled "Combined Hidden Dynamic Random Access Devices and Encryption Systems Utilizing Selectable Keys and Key Locators for Communicating Randomized Encrypted Data Together with Sub-Channels and Executable Coded Encryption Keys", filed Aug. 2, 2017.

Further, application Ser. No. 16/006,011, filed Jun. 12, 2018, granted as U.S. Pat. No. 10,158,613 on Dec. 18, 2018, is a continuation-in-part of U.S. Nonprovisional application Ser. No. 16/005,040 filed Jun. 11, 2018 entitled "Securitization of Temporal Digital Communications with Authentication and Validation of User and Access Devices", granted as U.S. Pat. No. 10,154,021 on Dec. 11, 2018.

All applications are hereby incorporated by reference in their entirety.

FIELD OF INVENTION

The present disclosure relates to randomized encryption of communications, and more particularly to a system that encrypts and decrypts signals between devices to ensure that the communications with and from software containers are discoverable by only designated third parties. Methods and devices for encryption of these (primarily digital and normally two-way) communications to, from, and within software containers using applications that may be combined with authorization and validation for receiving, storing, and retrieval of electronic, optical, and/or electro-optical communications in the form of voice, data, or optical transmissions, are also included. These encrypted and decrypted data and data communications require special encryption techniques essential to denying fraudulent or otherwise unauthorized third parties with the ability to access sealed encrypted transmissions used with data at rest as well as for data on the move and specific to data to, from and within software containers.

The present disclosure includes devices and a system that is specifically suited for data transmission applications that require a need for discrete communications, preserving privacy of information, electronic commerce transactions, electronic mail communications all required for solving security issues associated with software containers.

BACKGROUND

Software development is a rapidly-changing field that's moving faster than ever. Historically, software has been built in a "Waterfall" way, meaning that software products are defined, developed, tested, released and maintained in sequential order. The Waterfall days have essentially ended because the pace of technology innovation and business continue to accelerate, so developers have less time than ever to get a product or product upgrade to market.

The environment in which software runs has become more complex. Decades ago, there were few operating systems and not many PC manufacturers. Now, many companies are building laptops, tablets, phones, and other everyday products that have computing capabilities. Those devices run on a myriad of networks and communicate with each other across those networks. As consumers, we don't care about all the technical details that make up the environment in which the software we use runs, we just want to do what we want, when we want to do it.

The faster product cycles and increased environmental complexity have forced software teams to adopt new ways of working. The new work styles ensure that better quality products can be delivered faster.

For the last couple of decades, increasing numbers of software teams have become "Agile." Essentially, Agile methodologies enable software teams to deliver better quality software faster. To do that, they break down what used to be huge software programs into much smaller parts. While it might seem counterintuitive, Agile teams can actually accomplish more in less time than Waterfall teams.

The reason Agile methods enable faster delivery of better quality software is because small pieces have smaller setbacks and larger pieces have larger setbacks. For example, companies have spent a year or two building software products that cost millions of dollars only to discover that it doesn't align with a market requirement or the software quality is poor.

By doing small things rapidly, Agile teams can "fail fast" and fix their mistakes as they go. Agile teams also benefit from a constant customer feedback loop which allows them to manage their time and budgets more effectively. Another characteristic of Agile teams is that they're cross-functional. Rather than doing their specific jobs and not really communicating with other functions (which is typical of Waterfall practices), they're working together to set priorities and remove inefficiencies from their processes.

"DevOps" combines software development and operations. The trend started to gain momentum in the early 2000's because there were often disconnects between how a developer thinks the software he's building will operate in the real world and how that software actually works in the real-world.

Developers and operations teams don't naturally come together, however. They have to agree to cooperatively embrace DevOps. Historically, the two groups have had a contentious relationship because developers want access to "production" systems so they understand how their software will behave in the real world. However, operations do not want to give developers access to production systems because their business runs on them. One simple misconfiguration could cause all or part of a business to be "shut down."

To solve this problem, some vendors built software tools that allow developers to emulate production systems, but real and fictional environments tend to differ. Cloud computing helps to resolve the differences because actual and test systems can be configured more identically. (Basically, a "cloud" is a massive compute and storage environment that businesses can rent on a usage basis. Slowly, but surely, businesses across industries are moving to the cloud because they're finding it very difficult if not impossible to continue building and maintaining their own information technology (IT) infrastructures in today's fast-changing business world).

Clouds are increasingly important to software development, because more and more applications are running in clouds, such as mobile phone applications, Facebook, Google, and Amazon.

Continuous delivery is a software development method that builds upon the concepts associated with both Agile and DevOps. Continuous delivery works faster than either Agile or DevOps can on their own. It's necessary, because software delivery cycles are continuing to shrink. There are several reasons why the cycles are shrinking including the two biggest factors; customer expectations and disruptive companies that have always operated online or in the cloud ("digital natives").

The most progressive software companies are increasing employing continuous delivery, if not continuous deployment, which moves at an even faster pace. These companies aren't delivering software once a year, once a quarter or even once a month. They're releasing software weekly, daily, or in most cases, several times per day. How often a company releases software really depends on its business model and its customers' expectations. However, they are all under pressure to deliver software faster.

This acceleration and speed at which software development is occurring is associated with an increased loss of securitization.

When it takes software a year or two to go from concept to product delivery, there's more time for quality and security related testing. As software cycles diminish, there is less time for quality and security checks. Shortcuts and oversights can be devastating. For example, the Equifax breach discovered in 2017 was the result of failing to update ("patch") certain open source software in a timely manner. The patch had been available for the six months leading up to the breach. Had Equifax installed the patch, that particular hacking incident wouldn't have occurred when it did or perhaps not at all.

Hackers and software "pirates" expect software developers to make mistakes and take shortcuts. They also expect to find holes in software testing, and they are betting on the fact that even security experts don't understand all the vulnerabilities. Given the amount of software that powers our modern world and the increasing speed at which that software is being developed, security breaches will continue to occur. Unfortunately, security breaches are becoming increasingly common and increasingly severe.

The present disclosure was developed so that software developers can secure the products they're building without spending any extra time, which makes it ideal for Agile and DevOps teams whether they're performing Continuous Delivery or not. If they want their software or device to communicate with any other piece of software or device securely, the present disclosure addresses this need.

Given the pervasive nature of software today, companies and individuals are constantly at risk. Although it's not apparent to most people, software runs almost everything you can think of from manufacturing floors to airplanes, cars, TVs and children's toys. All of the software developers, and the organizations for which they work, are responsible for the quality of the software they're building. Security is a critical part of quality, and it's becoming increasingly important.

Software containers are a solution to the problem of how to get software to run reliably when moved from one computing environment to another. These containers can be utilized for example for anything including a software developer's laptop to a test environment, from a staging environment into production, as well as from a physical machine in a data center to a virtual machine in a private or public cloud.

Problems arise when one or more supporting software environments are not identical. For example if a software developer or architect is going to test using Python 2.7, (Python is an interpreted, object-oriented programming language similar to PERL, that has gained popularity because of its clear syntax and readability) and then run the executable program on Python 3 in production, there is a degree of probability that something unexpected will occur. Another issue that may arise, is if the developer relies on the behavior of a certain version of an SSL library (SSL is a programming library that secures communications. SSL is a standard way of establishing communication between two devices over a network where others could be "listening in" on the conversation) but another one is installed instead. The developer could perform testing on Debian (Debian is a Unix-like computer operating system that is composed entirely of free software, most of which is under the GNU General Public License and packaged by a group of individuals participating in the Debian Project). and production is performed using a Red Hat operating system. Again, the results could be and often lead to unexpected/unintended consequences. These issues are not confined to software malfunctions but network topology might not match and/or the security policies and storage might be different. In all cases, however the software still has to perform properly and as initially intended.

Software containers are utilized to solve these issues. Put simply, a container consists of an entire runtime environment: an application, plus all its dependencies, libraries and other binaries, and configuration files needed to run (execute) it, bundled into one package. By containerizing the application platform and its dependencies, differences in OS (operating system) distributions and underlying infrastructure are abstracted away.

There is a difference between containers and virtualization technology. With virtualization technology, the package that can be passed around is a virtual machine, and it includes an entire operating system as well as the application. A physical server running three virtual machines would have a hypervisor and three separate operating systems running on top of it.

By contrast, a server running three containerized applications using software containers runs a single operating system, and each container shares the operating system kernel with the other software containers. Shared parts of the (OS) operating system are read only, while each software container has its own mount (i.e., a way to access the container) for writing. That means the software containers are much more lightweight and use far fewer resources than virtual machines.

Other benefits of implementing software containers includes the fact that a container may be only tens of megabytes in size, whereas a virtual machine with its own entire operating system may be several gigabytes in size. In this instance, a single server can host far more containers than virtual machines.

Another major benefit is that virtual machines may take several minutes to boot up their operating systems and begin running the applications they host, while containerized applications can be started almost instantly. This means that software containers can be instantiated in a "just in time" fashion when they are needed and can disappear when they are no longer required, freeing up resources on their hosts.

A third benefit is that containerization allows for greater modularity. Rather than run an entire complex application inside a single software container, the application can be split into processor s (such as the database, the application front end, etc.). This is the so-called "microservices approach". Applications built and provided in this manner are easier to manage because each processor is relatively simple, and changes can be made to processor s without having to rebuild the entire application. Because software containers are so lightweight, individual processors (or microservices) can be instantiated only when they are needed and are available almost immediately.

A company known as "Docker" has become synonymous with software container technology because it has been the most successful at popularizing it. However, software container technology is not new; it has been built into Linux operating systems in the form of LXC for over 10 years, and similar operating system level virtualization has also been offered by FreeBSD jails, AIX Workload Partitions and Solaris Containers.

Standardization of software containers began in earnest in 2015, with another company known as CoreOS, which produced its own App Container Image (ACI) specification that was different from Docker's container specification, and at the time there was a risk that the newly-popular container movement would fragment with rival Linux container formats.

However, later in the same year, an initiative known as the "Open Container Project" was announced, and later renamed as the Open Container Initiative (OCI). Run under the auspices of the Linux Foundation, the purpose of the OCI is to develop industry standards for a container format and container runtime software for all platforms. The starting point of the OCP standards was Docker technology, and Docker donated about 5 percent of its codebase to the project to get started. Additional project sponsors include; AWS, Google, IBM, HP, Microsoft, VMware, Red Hat, Oracle, Twitter, and HP as well as Docker and CoreOS The idea of the OCI is to ensure that the fundamental building blocks of software container technology (such as the container format) are standardized so that all software developers and architects can take advantage of them. This initiative would then provide the ability to reduce spending resources developing competing software container technologies so that organizations can focus on developing the additional software needed to support the use of standardized software containers in an enterprise or cloud environment. The type of software needed includes A major concern and major objective of the present disclosure involves the fact that many people believe that software containers are less secure than virtual machines. This is due, in part, to the possibility that if there is a vulnerability in the container host kernel, this vulnerability can provide a way into the software containers that share the host kernel. This issue is also true for a hypervisor. A hypervisor is a virtual machine monitor (VMM) that is computer software, firmware or hardware that creates and runs virtual machines. A computer on which a hypervisor runs one or more virtual machines is called a host machine, and each virtual machine is called a guest machine. However, because a hypervisor provides far less functionality than a Linux kernel (which typically implements file systems, networking, application process controls and so on) it presents a much smaller attack "surface" for a virus to be implanted or to access sensitive data. In the last couple few years a great deal of effort has been devoted to developing software to enhance the security of containers. For example, Docker (and other container systems) now include a signing infrastructure allowing administrators to sign container images to prevent untrusted containers from being deployed.

However, it is not necessarily the case that a trusted, signed container is secure to run, because vulnerabilities may be discovered in some of the software in the container after it has been signed. For that reason, Docker and others offer container security scanning solutions that can notify administrators if any container images have vulnerabilities that could be exploited.

More specialized container security software has also been developed. For example, Twistlock offers software that profiles a container's expected behavior and "whitelists" processes, networking activities (such as source and destination IP addresses and ports) and even certain storage practices so that any malicious or unexpected behavior can be flagged.

Another specialist container security company known as Polyverse takes a different approach. It takes advantage of the fact that containers can be started in a fraction of a second to relaunch containerized applications in a known "good" state every few seconds to minimize the time that a hacker has to exploit an application running in a software container.

Using the devices and techniques of the present disclosure, developers can start securing their applications within a relatively short period of time. They won't have to configure anything or know anything about security for the system to properly operate. Developers can simply wrap their application up in a software container which is like placing personal items in a portable storage container that's under lock and key.

However, unlike storage containers, the software containers of the present disclosure are able to communicate with each other securely via an encrypted link.

The present disclosure provides software developers with a new and better way to secure whatever software they're building so when that software communicates with either a copy of itself or other types of software, including the software resident in various types of devices, the data is kept safe. More specifically, the present disclosure describes the use of the first known context-free and natively-secure software containers that enable software developers the ability to take ownership of application data security. Context free means that developers do not have to rely on a particular vendor/platform (i.e. Amazon, IBM, Cisco, etc.) and is independent of the type of container used. These devices and system are "natively secure" in that they are built into the actual structure of the container itself. Securitization and encryption occurs at the transport layer such that the application developers are writing applications that create connections to the rest of the communications world at the transport layer. In this manner, the application developers/writers who create the applications can take ownership of the security themselves instead of handing it off to someone else in the operation or to some external router. Developers using the system disclosed are now in full control of security in that the developer is specifying the data security and the data security is being supplied to their application as they determine and as they complete their task(s). Companies developing software applications such as Layer 3 (Norcross, Ga.) and Technologent (Irvine, Calif.) are anxious to deploy this new development. They see the system as the ability to offer a ubiquitous capability to provide security for specific platforms. Utilizing the devices and system of the present disclosure, any developer can secure communication between software containers across disparate scheduling and orchestration platforms, IaaS (internet as a service) services, transport-layer security protocols, and on-premises or hybrid environments using Docker-compatible hypervisors. Such hybrid IT environments include colocation (hypervisor) and AWS ECS.

This system provides DevOps teams with a method to build, deploy and run secure container applications without the costs associated with legacy security strategies.

Using software containers will also become more ubiquitous due to the new securitization techniques disclosed herein because the legacy security strategies will either use an appliance (routers, servers, etc.) which will contain the presently disclosed security system or because legacy security can be improved by running a small program (software routine) that can be included with (added to running on) the actual legacy equipment. This small program is a symmetric TLS library (currently written in Python) that encrypts and decrypts egress and ingress layer 4 traffic (respectfully) using configurable symmetric encryption TLS cipher suites. This program is often embedded (the code) into the container. The library is 2.5 times faster than the most used open source python crypto wrapper, meaning that cross-platform networks can now be effectively secured without suffering unacceptable latencies.

Further description of layer 4 traffic is provided below. This software routine can be installed on another piece of computer equipment and is both the library and the intercept of the present disclosure added in the form of a software router.

Currently, legacy systems are supposed to provide secure communications via IP SEC- or IP security. IP security is a layer 3 protocol that supplies secure channels/tunnels between IP addresses. In this case, tunnels themselves may carry signals that may include channels and tunnels may carry channels or tunnels may carry signals through other tunnels. Here, a data channel is an information route with associated circuitry that passes data between systems or parts of systems. Tunnels in this case also refers to tunneling and is a mechanism used to ship a foreign protocol across a network that normally would not support that protocol. In either case, a tunnel can be used to penetrate through obstructions (such as firewalls that would be otherwise impenetrable) where channels may not provide this feature. A significant issue that the present disclosure addresses includes the fact that IP SEC is a difficult to configure and a difficult to keep operating software that is normally inserted into an appliance. There is also difficulty with operating IP SEC as there is a limited amount of encryption security using the standards available. The cost of IP SEC is also relatively high and normally provided by very few vendors including CISCO. IP SEC normally involves scheduling and orchestration platforms—this is for network servers and is a form of load balancing that requires computer resource scheduling. Orchestration involves the location where the code (in this case the security code) is being executed. To date, inter-container communications have not been addressed adequately by existing container orchestration frameworks and protocols. ICEMicro changes that by providing developers with a natively secure container image to package application code. Since secure communications are an inherent feature, any two ICEMicro containers can communicate securely "out of the box."

Another significant issue is the disparity caused when different network resources operate on different companies' clouds, often causing extreme communication mishaps. Currently the solution has been that disparate regions also function on different clouds (e.g. Amazon UK vs Amazon, USA) and a current method to get these two disparate entities to communicate with each other is to get another resource from Amazon for both ends and pay for a bridge between one application on Amazon US to one or more applications with Amazon UK. This requires adding another virtual device that has to run on the Amazon platform. Either Amazon provides this service or you pay Cisco for their Virtual Router. Another possibility is that the developers must write the code themselves which becomes embedded on both ends. In this last instance, the developer must now manage their own communication security has to develop new code. Normally, no developer wants to purchase Cisco's IP SEC or use Amazon's or some other software equivalent. Today Cisco and its affiliates utilize a software version of IP SEC which is encrypted and Amazon and others do not have this security application. In short, developers are utilizing hybrids that may or may not provide the security they think they are applying to newly developed software using software containers.

In contrast, the present disclosure utilizes a level 4 securitization technique for TLS (transport layer security). Level 4 refers to layers that are in a communications stack which from bottom to top is as follows:
Communication Layer (1): Wires and connectors
Communication Layer (2): Software running over Layer 1—such as token ring or ethernet
Communication Layer (3): Wireless area networks—if wireless connecting from one computer or other hardware device to another IP address—such as the internet—IP address to IP address communications.
Communication Layer (4): As communications go through the stack from top to bottom, where the manner of transport is irrelevant this last layer becomes the security layer, which presently is where IP SEC resides and is executed.

This "Layer 4" is known as the transport layer security level or TLS—where security is occurring at the transport layer. Here is where the communications "traffic" is routing from or to communications ports. Typically layer 4 is attached to the application itself and provides logical connections between applications. This, understandably is why TLS security is critical. The present disclosure describes devices and systems that places the TLS security into the structure of the container itself. In this manner, a developer can provide any application immediate security within the container using the "ICEMicro security devices and systems". The system allows the developer to inform the container(s) what connections are allowed between transport layer(s) and where the "ICEMicro" securitization and/or encryption should be placed. This technique creates and provides a "tunnel" that now exists from one container to a different container and utilizes its own dynamic key and with its own tunnel. The ICE system may provide multiple tunnels as there are 16 bits of tunnels which equates to 65,535 ports, all of which can possess their own keys. The keys are dynamically changed by the "ICE" Library. In addition, each tunnel can go to any other location (including other containers), all capable of running individual independent sets of security on their data transmissions. Developers will gain significant speed and efficiency using the "ICE" system, as securing communications between two containers is accomplished as quickly as applications can be created. ICEMicro does not require additional development overhead or network security expertise.

Presently, developers who use TLS security don't get this level of security from other platforms provided by other vendors. Unlike most current strategies, ICEMicro does not depend on the transport layer for data security. However, it is compatible with any transport layer security protocol. Transport layer security protocol vulnerabilities are well known. As quickly as protocol upgrades are deployed, hackers exploit new vulnerabilities. Networks deploying legacy TLS pose even higher risks. ICEMicro is agnostic to the TLS protocol and natively secures the communications between containers within legacy or greenfield environments, limiting successful TLS hacks access to encrypted data only. Essentially, ICEMicro renders TLS unnecessary.

The devices and system of the present disclosure utilize running dynamic ephemeral (temporary) keys as another layer of protection provided by the encryption tools (also described herewithin). The present disclosure describes an "ICEMicro" version of a TLS protocol, which can be run on/or embedded in containers (or hybrid systems). In addition, the present disclosure supports container compatible Hypervisors. Hypervisors are layers of software located between the actual computer systems and the operating systems—which enables virtual operating systems and controls instruction sets to operate on the same computing platforms developers utilize during software development. In addition, the Hypervisor translates the capabilities of some hardware into a portion of a standardized virtual hardware and controls the access to that virtual hardware.

The ICEMicro devices and system of the present disclosure provides security bridges to containers directly with built-in security DASA encryption. These are security bridges for communications between containers. The system also provides for communications from one container to a legacy network/device or from a legacy network/device to another legacy or any other network or communicating device, whether networked or not. Dynamic Encryption Technology eliminates vulnerabilities caused by exposure of any single encryption key by continuously changing encryption keys and keeping the keys synchronized in a fault-tolerant manner.

Perpetual Authentication Technology uses multiple virtual channels or tunnels for encryption so that in the event one channel or tunnel is compromised, the other tunnels maintain encryption integrity. Together, these technologies not only eliminate the single point of failure problem created by having keys exposed through brute force, side channel, or other types of attack, but do so with very low latency and performance overhead. Whether at rest or in-motion, the encryption processes described ensures communications data (and all associated signals) remains safe, secure and uncompromised.

Up to this point, unmanageable encryption overhead has prompted developers to transfer encryption responsibilities to business operations, ultimately inflating costs.

The present disclosure and associated invention provides technology that abstracts container services into a Trustplane. The Trustplane secures data in transit simply and reliably, allowing developers to ensure data integrity without concern for Data Plane and Control Plane configurations or security vulnerabilities. With applications running in natively-secured ICEMicro containers, VPNs are no longer the vulnerable and expensive chokepoint that limits multi-environment deployments.

No known software container security systems, however, exist that will perform the use of singularly or in combination hidden dynamic random access devices with an encryption system utilizing selectable keys and key locators for communications using randomized encrypted data together with sub-channels and executable coded encryption keys.

As it is known in cryptology, encryption techniques (codification) using standard and evolving algorithms are used so that data exposed to undesirable third parties are encrypted making it difficult (and intended to be impossible) for an unauthorized third party to see or use it. Usually, for encryption, the term 'plaintext' refers to a text which has not been coded or encrypted. In most cases the plaintext is usually directly readable, and the terms 'cipher-text' or 'encrypted text' are used to refer to text that has been coded or "encrypted". Encryption experts also assert that, despite the name, "plaintext", the word is also synonymous with textual data and binary data, both in data file and computer file form. The term "plaintext" also refers to serial data transferred, for example, from a communication system such as a satellite, telephone or electronic mail system. Terms such as 'encryption' and 'enciphering', 'encrypted' and 'ciphered', 'encrypting device' and 'ciphering device', 'decrypting device' and 'decipher device' have an equivalent meaning within cryptology and are herein used to describe devices and methods that include encryption and decryption techniques.

There is an increasing need for security in communications over public and private networks. The expanding popularity of the Internet, and especially the World Wide Web, have lured many more people and businesses into the realm of network communications. There has been a concomitant rapid growth in the transmission of confidential information over these networks. As a consequence, there is a critical need for improved approaches to ensuring the confidentiality of private information and especially for software containers.

Network security is a burgeoning field. There are well known encryption algorithms, authentication techniques and integrity checking mechanisms which serve as the foundation for today's secure communications. For example, public key encryption techniques using RSA and Diffie-Hellman are widely used. Well known public key encryption techniques generally described in the following U.S. Pat. No. 4,200,770 entitled, Cryptographic Apparatus and Method, invented by Hellman, Diffie and Merkle; U.S. Pat. No. 4,218,582 entitled, Public Key Cryptographic Apparatus and Method, invented by Hellman and Merkle; U.S. Pat. No. 4,405,829 entitled Cryptographic Communications System and Method, invented by Rivest, Shamir and Adleman; and U.S. Pat. No. 4,424,414 entitled, Exponentiation Cryptographic Apparatus and Method, invented by Hellman and Pohlig. For a general discussion of network security, refer to Network and Internetwork Security, by William Stallings, Prentice Hall, Inc., 1995.

In spite of the great strides that have been made in network security, there still is a need for further improvement. For example, with the proliferation of heterogeneous network environments in which different host computers use different operating system platforms, there is an increasing need for a security mechanism that is platform independent. Moreover, with the increasing sophistication and variety of application programs that seek access to a wide range of information over networks, there is an increasing need for a security mechanism that can work with many different types of applications that request a wide variety of different types of information from a wide variety of different types of server applications. Furthermore, as security becomes more important and the volume of confidential network transactions expands, it becomes increasingly important to ensure that security can be achieved efficiently, with minimal time and effort.

The creation of proprietary digital information is arguably the most valuable intellectual asset developed, shared, and traded among individuals, businesses, institutions, and countries today. This information is mostly defined in electronic digital formats, e.g., alphanumeric, audio, video, photographic, scanned image, etc. It is well known that a large number of encryption schemes have been used for at least the last 100 years and deployed more frequently since the onset of World Wars I and II. Since the beginning of the cold war, the "cat and mouse" spy missions have further promulgated the need for secure encryption devices and associated systems.

Simultaneously, there has been an increased need for mobility of transmissions including data and signals by physical or logical transport between home and office, or from office to office(s) among designated recipients. The dramatic increase in the velocity of business transactions and the fusion of business, home, and travel environments has accelerated sharing of this proprietary commercial, government, and military digital information. To facilitate sharing and mobility, large amounts of valuable information may be stored on a variety of portable storage devices (e.g., memory cards, memory sticks, flash drives, optical and hard disc magnetic media) and moved among home and office PCs, portable laptops, PDAs and cell phones, and data and video players and recorders. The physical mobility of these storage devices makes them vulnerable to theft, capture, loss, and possible misuse. Indeed, the storage capacity of such portable storage devices is now approaching a terabyte, sufficient to capture an entire computer operating environment and associated data. This would permit copying a targeted computer on the storage media and replicating the entire data environment on an unauthorized "virgin" computer or host device.

Another trend in data mobility is to upload and download data on demand over a network, so that the most recent version of the data is always accessible and can be shared only with authorized users. This facilitates the use of "thin client" software and minimizes the cost of storing replicated versions of the data, facilitates the implementation of a common backup and long-term storage retention and/or purging plan, and may provide enhanced visibility and auditing as to who accessed the data and the time of access, as may be required for regulatory compliance. However, thin client software greatly increases the vulnerability of such data to hackers who are able to penetrate the firewalls and other mechanisms, unless the data is encrypted on the storage medium in such a way that only authorized users could make sense of it, even if an unauthorized user were able to access the encrypted files.

There is a balance among legal, economic, national security, and pragmatic motivations to develop robust security implementations and policies to protect the storage of proprietary digital information, based on the value of the information, the consequences of its exposure or theft, and the identification and trust associated with each of the targeted recipients. In order to provide such varying degrees of protection for portable storage devices, system methods and application functionality must be developed and easily integrated into the operating procedures of the relevant institutions. Different policies defining degrees of protection are required to economically accommodate and adapt to a wide range of targeted recipient audiences for this data.

Known encryption systems for these devices include the "Data Encryption Standard" ("DES"), which was initially standardized by the "American National Bureau of Standards", currently "National Institute of Standards and Technology" ("NBS" or "NIST") in the United States. Another includes the "Fast data encipherment algorithm FEAL" (FEAL) developed later in Japan, and described in the IECEJ Technical Report IT 86-33. U.S. Pat. No. 5,214,703 entitled "Device for the Conversion of a Digital Block and Use of Same" describes the use of additional devices as does an encryption device described in U.S. Pat. No. 5,675,653 entitled "Method and Apparatus for Digital Encryption". In most cases, the user making use of protecting the data after encryption or enciphering of a plaintext has delegated the strength of the invulnerability of the encryption to be positioned in front of an enemy attack. This positioning is aimed to discover the contents of the cipher text or the encryption key used, trusting in the organizations, institutions, or experts endorsing their security and providing a degree of confusion and diffusion of values introduced by the encryption device used in the cipher text. The user encrypting a particular plaintext has no objective security regarding the degree of confusion and diffusion of values present in a cipher text that result from the application of the encryption device. Attacks on personal computers and commercial, government and military data are now commonplace; indeed, identity theft of passwords is the largest white-collar crime in the United States. Yet passwords and PINs (Personal Identification Numbers), in most cases generated by human beings who are tempted to use native-language words, Social Security Numbers, telephone numbers, etc., are still the most used access security methods for protecting portable encryption devices, and among the most vulnerable to both brute force dictionary attacks as well as sophisticated logic tracing. Professional criminal attackers and even amateur hackers now have access to sophisticated software and supercomputing networks that can unknowingly invade processing devices and storage devices, trace software instruction sequences and memory locations, and by knowing or discovering the algorithms being used, intercept and copy encryption keys, PINs, and other profile data used to protect the access to stored content. They can exploit vulnerabilities in the underlying commercial software, or in the construction of the integrated circuit chips housing and executing the cryptographic processes, or in the specialized cryptographic software, which enables exposing keys and access parameters at some deterministic point in the processing sequence. Industrial laboratory facilities are also available to read the data content stored in memory cells by measuring the electronic charge through the use of electronic beam microscopes, and thus steal stored PINs, keys, and therefore access the previously protected data.

Many prior methods exist for the key management protection necessary for securing key encryption keys for large groups of users. Split-key secret sharing schemes have been proposed whereby the decryption key is split and shared among multiple parties or entities to be combined to reconstitute the decryption key. In these cases, however, the individual secret shares themselves are maintained statically in multiple storage devices, generally on-line, where they are susceptible to attackers, particularly from within the institution, who can target the secret shares and recombine then to form the decryption key. Such solutions are often implemented for relatively static configurations of computing and storage devices and related communities of interest or tiers of users, and have not addressed the ability to so protect key encrypting keys when the data itself, and the means to encrypt and decrypt the data and to generate and recombine the shared secrets, are on a portable device.

Current file encryption systems provide a technique for a general-purpose computer to encrypt or decrypt computer-based files. Current encryption and decryption techniques typically rely on lengthy strings (e.g., 1024 bits, 2048 bits, 4096 bits, or more) to provide for secure encryption or decryption of files. Computer performance suffers due to the amount of data in the messages as well as the size of the encryption keys themselves.

Asymmetric file encryption systems use a different key to encrypt a file from the key used to decrypt the encrypted file. Many current file encryption systems rely on asymmetric encryption, such as those that rely on public key/private key pairs. An example of an encryption algorithm that utilizes public key/private key pairs is the RSA (Rivest, Shamir, and Adleman) algorithm. Symmetric file systems use an identical key to encrypt a file as the key used to decrypt the encrypted file. Certain file encryption systems utilize a cryptographic process or random number generator to derive a random symmetric key known as the file encryption key (FEK). The FEK is used to encrypt the file. Symmetric cryptography functions up to five orders of magnitude faster than asymmetric cryptography on files. Even with a very fast key device or software that encrypts/decrypts using the asymmetric key, any such file encryption system still has to overcome the fact that asymmetric keys generally operate at orders of magnitude slower than symmetric keys. When using the file encryption key, each time a file is being authenticated, the file encryption key has to be decrypted by the asymmetric key which is time consuming, but becoming less so as computer speeds and operations are constantly improving.

What is needed are highly robust and proven security techniques incorporated into new system methods and into new commercially available portable storage hardware apparatus to implement configurable security policies for accessing information through rigorous authentication means, to secure the information with certified levels of accepted cryptographic technology, and to rigorously control the environment within which the information is shared.

In addition, there is a need to better secure portable storage apparatus and method of encrypting and sealing digital information files and storing them in the device's integral or removable memory, or alternatively on the host device's memory or other ancillary memory storage devices, while operating under cryptographically protected security policies for transport and authorized access to such digital information.

There is also a need for secure physical and logical transport of data to and from multiple recipients. To this end, it is desirable to provide a means of securely transporting data from one place to another, if the user has to carry the data or physically transport the data and the secure encryption device, and somehow communicate the information necessary to log on and access the data by another authorized user. What is required are a multiplicity of methods to securely transport the encrypted data, either physically or logically, between an Originator user and one or more Receivers.

The use of encryption devices by the general population is becoming very common in for example, commercial electronic transactions and/or electronic mail. A predominant portion of all societies want to believe in an objective, easily verified way, that the maximum degree of the diffusion and confusion (encryption) of data and data values provided by a system they are using to encrypt their data, is the superior set of encrypted devices and system.

The present disclosure relates generally to a cryptographic management scheme that provides for network security, mobile security, and specifically and more particularly relates to devices (such as containers) and a system for creating and manipulating encryption keys without risking the security of the key. The present disclosure addresses all of the needs described directly herein, as well as described earlier above.

SUMMARY

As stated above, the present disclosure describes one or more securitized container management devices, comprising at least one control plane, at least one trust plane, and at least one container, wherein at least a single path transfers signals controlled by a controller that exists within a control plane to the trust plane and/or the container, wherein the signals further travel through said control plane to the trust plane and/or the containers and wherein the signals are securitized and/or encrypted either before, or as the signals enter the at least one container.

In a further embodiment at least one container is connected to the control plane such that the signals enter the container subsequent to an entrance to the control plane, wherein the control plane accesses one or more containers and wherein a set of instructions is added to the containers via one or more application logic repositories and from one or more container prototype repositories,
and;
wherein the at least one container is connected to the trust plane such that the signals enter the container subsequent to entering said trust plane.

The signals are sent directly from the control plane to at least one container and wherein signals from the control plane are control plane signals.

The signals can also be sent directly from the trust plane to at least one container and wherein signals from the trust plane are trust plane signals.

The container devices have control plane signals that flow through the trust plane or other mechanism that provides trust prior to entrance into the containers.

In many cases, the signals are communications signals. Often, the communications signals either contain or themselves are data transmissions.

The signals can be securitized while the containers are created, and wherein securitized signals are a mechanism of trust.

The signals can be securitized for containers that already exist.

In addition, the signals can be encrypted for containers that either are created or already exist and wherein encrypted signals are a mechanism of trust.

The signals are securitized and encrypted for containers that either are created or already exist and wherein securitized and encrypted signals are a mechanism of trust.

The signals travel through one or more tunnels from said control plane to said trust plane and wherein said signals travel through one or more tunnels from said either said control plane or said trust plane or both planes into and out of said containers.

The tunnels themselves may be securitized and carry securitized transmissions.

The tunnels themselves may be encrypted and carry encrypted transmissions.

The tunnels can be both securitized and encrypted and carry both securitized and encrypted transmissions.

The transmissions can be data, voice, and/or optical transmissions and wherein the signals are comprised of electrical, optical, mechanical, electromagnetic, and/or radiative energy from an energy source capable of providing such signals.

In some cases, the tunnels are channels through which signals travel.

The devices include a statistics processor wherein statistics exist for setup and operational parameters, system resource use, communications connections, volume of data, run time and external communications monitoring.

The devices also include statistics also provide for statistical correlation and autocorrelation to create warnings and alarms for containers that do not maintain statistical norms in comparison with containers that are within statistical norms.

The trust plane provides both inter-container and external container connections for signals traveling into and out of the trust plane.

The control plane provides both inter-container and external container connections for signals traveling into and out of the control plane.

In a further embodiment, the signals into, out of, or within the control plane provides an ability to create, initiate, modify, destroy and remove the containers, such that the containers are temporary and obsolete subsequent to deployment.

Signals from the control plane are authenticated, verified and/or encrypted by the controller wherein the controller exists either within or external to the control plane.

In addition, the signals from the trust plane are authenticated, verified and/or encrypted by a controller that exists either within or external to the trust plane.

Here the containers can all be embedded with secure communications.

In addition, the container devices operate in a frictionless manner in that scripted control and operation occurs without interruption and wherein originated signals remain intact during operation.

The signals can carry preprogrammed source code that enables and manages operation of the containers. In all cases, the container devices are virtual devices.

In a further set of embodiments, a method for using one or more securitized container management devices wherein the devices are comprising at least one control plane, at least one trust plane, and at least one container, wherein at least a single path is transferring signals controlled by a controller that is existing within a control plane to the trust plane and/or the container, and wherein the signals continue traveling through the control plane to the trust plane and/or the containers and wherein the signals are securitized and/or encrypted either before, or as the signals are entering at least one container.

This disclosure also provides for a method which serves to manage one or more securitized container devices and systems comprising;

initializing a container image that is validated and downloaded onto or into at least once container, wherein a validated program is loaded onto the container that requires reserve computer resources including one or more input/output interface(s), a memory, and network capabilities such that encryption of container-related data at rest or data in transit is implemented by utilizing dynamically changing keys created for each input/output tunnel and/or for each container utilizing the tunnel that are providing transmissions path(s) for loading containers with software applications protected by said encryption.

The keys are loaded into or onto container security portions of the container thereby leading to establishment of initial communications tunnels and allowing for validation that security has been implemented.

Use of a container occurs after securitization and encryption is complete so that a container's function in developing a software application can be completed without sacrificing security.

As the container devices are created and subsequently discarded, statistics involving all securitization and encryption data at rest and data in transit can be monitored thereby leading to understanding notification when using the managed securitized container device and system.

DETAILED DESCRIPTION

Figure 1:
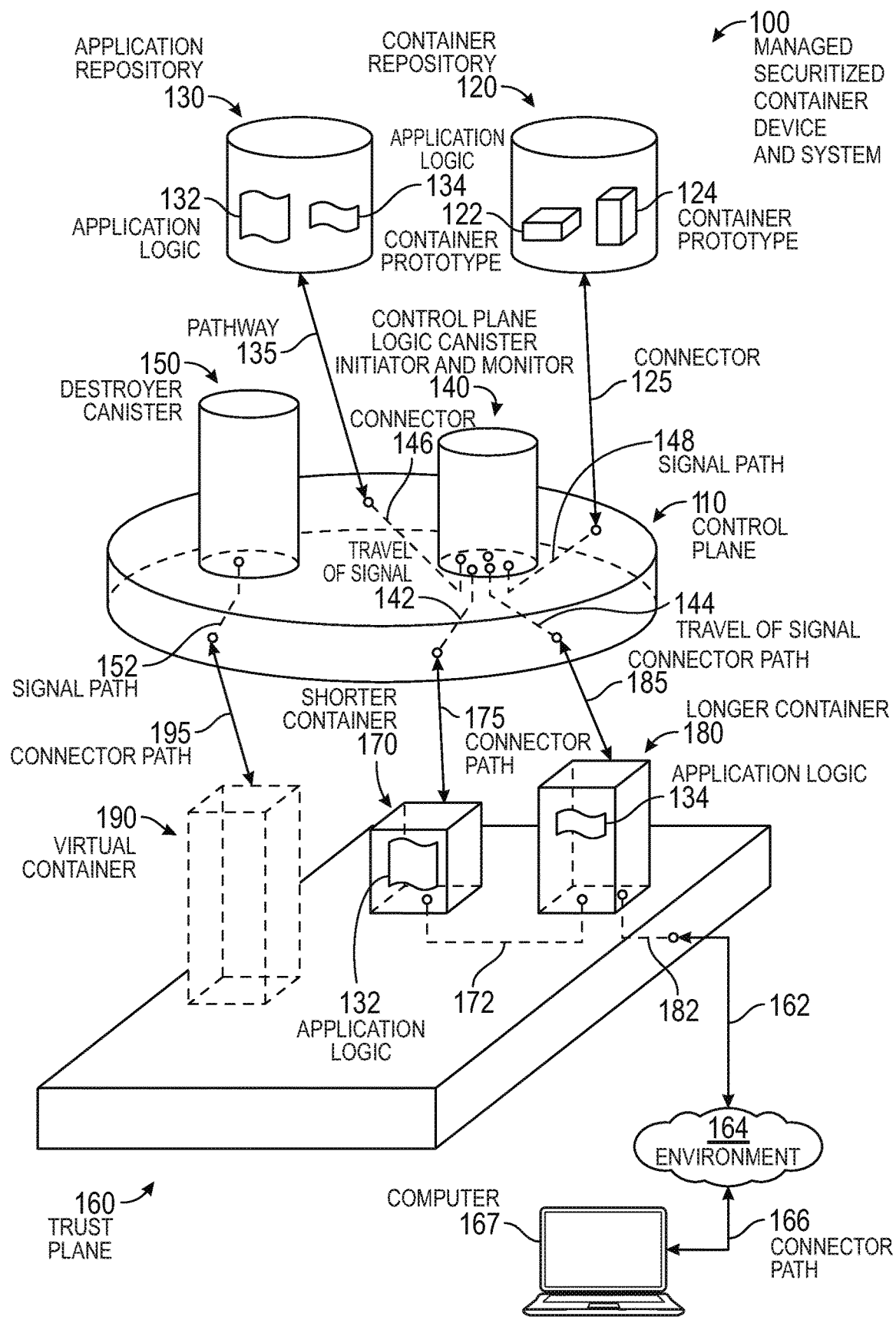
FIG. 1 is a three-dimensional schematic diagram illustrating and representing an exemplary device and associated system that provides the "ICEMicro" securitization and encryption device and associated system for software containers.

As described in detail above, container software developers are utilizing hybrids that may or may not provide the security they think they are applying to newly developed software using software containers.

In contrast, the present disclosure utilizes a level 4 securitization technique for TLS (transport layer security). Level 4 refers to layers that are in a communications stack which from bottom to top is as follows:

Communication Layer (1): Wires and connectors
Communication Layer (2): Software running over Layer 1—such as token ring or ethernet
Communication Layer (3): Wireless area networks—if wireless connecting from one computer or other hardware device to another IP address—such as the internet—IP address to IP address communications.
Communication Layer (4): As communications go through the stack from top to bottom, where the manner of transport is irrelevant this last layer becomes the security layer, which presently is where IP SEC resides and is executed.

This "Layer 4" is known as the transport layer security level or TLS—where security is occurring at the transport layer. Here is where the communications "traffic" is routing from or to communications ports. Typically layer 4 is attached to the application itself and provides logical connections between applications. This, understandably is why TLS security is critical. The present disclosure describes devices and systems that places the TLS security into the structure of the container itself. In this manner, a developer can provide any application immediate security within the container using the "ICEMicro security devices and systems". The system allows the developer to inform the container(s) what connections are allowed between transport layer(s) and where the "ICEMicro" securitization and/or encryption should be placed. This technique creates and provides a "tunnel" that now exists from one container to a different container and utilizes its own dynamic key and with its own tunnel. The ICE system may provide multiple tunnels as there are 16 bits of tunnels which equates to 65,535 ports, all of which can possess their own keys. The keys are dynamically changed by the "ICE" Library. In addition, each tunnel can go to any other location (including other containers), all capable of running individual independent sets of security on their data transmissions. Developers will gain significant speed and efficiency using the "ICE" system, as securing communications between two containers is accomplished as quickly as applications can be created. ICEMicro does not require additional development overhead or network security expertise.

The devices and system of the present disclosure utilize running dynamic ephemeral (temporary) keys as another layer of protection provided by the encryption tools (also described herewithin). The present disclosure describes an "ICEMicro" version of a TLS protocol, which can be run on/or embedded in containers (or hybrid systems). In addition, the present disclosure supports container compatible Hypervisors. Hypervisors are layers of software located between the actual computer systems and the operating systems—which enables virtual operating systems to operate on the same computing platforms developers utilize during software development.

In addition, the ICEMicro devices and system of the present disclosure provides security bridges so containers directly with built-in security DASA encryption. These are security bridges for communications between containers. The system also provides for communications from one container to a legacy network/device or from a legacy network/device to another legacy or any other network or communicating device, whether networked or not. Dynamic Encryption Technology eliminates vulnerabilities caused by exposure of any single encryption key by continuously changing encryption keys and keeping the keys synchronized in a fault-tolerant manner.

Perpetual Authentication Technology uses multiple virtual channels or tunnels for encryption so that in the event one channel or tunnel is compromised, the other tunnels maintain encryption integrity. Together, these technologies not only eliminate the single point of failure problem created by having keys exposed through brute force, side channel, or other types of attack, but do so with very low latency and performance overhead. Whether at rest or in-motion, the encryption processes described ensures communications data (and all associated signals) remains safe, secure and uncompromised. This encryption methodology is described both above and in full detail in the appendix to this application which is a previously filed Provisional application entitled "Combined Hidden Dynamic Random Access Devices and Encryption System Utilizing Selectable Keys and Key Locators for Communicating Randomized Encrypted Data together with Sub-Channels and Executable Coded Encryption Keys".

For FIG. 1, the managed securitized container device and system (100) is a shown as a three-dimensional schematic which initially includes a control plane (110), a container repository (120) and an application repository (130) with two (normally software) container prototypes (122,124) within the repository (120), and with two different types of applications logic (132,134), and a connector (125) which connects the containers (122, 124) to the control plane (110) as well as a connector which connects the application repository (130) to the control plane (110). Heading down the schematic from the top toward the bottom portions, there exists a control plane logic canister initiator and monitor (140), which is similar to but not necessarily identical to the control plane logic remover and destroyer canister (150). Here it is important to note that once these canisters and eventually the containers that may be created within or by the canisters, once used, will be discarded or destroyed. In other words, the usefulness of the containers, once they have delivered their content, diminishes and often has not further use. To alleviate or eliminate potential data memory and processing issues that occur for the overall system, discarding the containers is a normal course of activity for software developers. The containers may have had their contents emptied or they may be reused if not emptied. Moving further toward the bottom of the system (100), signals (normally communications signals) travel (142) from the control plane logic canister initiator and monitor toward the trust plane (160) via a connector path (175) from the control plane (110) to a shorter container (170) with application logic (132) which is either embedded in or sits atop the trust plane (160). The trust plane (160) provides both securitization and encryption as required by the system (100).

Likewise, signals travel (144) from the control plane logic canister initiator and monitor (140) via a connector (185) which also provides a signal path (or tunnel) toward the trust plane (160) via a connector (185) from the control plane (110) to a longer (higher) container with application logic (180) which is either embedded in or sits atop the trust plane (160). In some cases, the signals may travel from connector (146) connecting the application repository (130) directly to the control plane (110) bypassing the canisters (140,150) and eventually via a pathway (142) toward the connector path (175) which enters the either the container (170) or a portion of the trust plane (160). As before, the trust plane (160) provides both securitization and encryption as required by the system (100).

In addition, there is a signal path (146) that connects the control plane logic canister initiator and monitor (140) via pathway (135) and an application repository (130) with two (normally software) container prototypes (122,124) to ensure securitized communication(s) along this and all signal paths. Likewise, a signal path (148) connects control plane logic canister initiator and monitor (140) to a connector (125) which connects the containers (122, 124) to the control plane (110) as well as a connector which connects the container repository (120) to the control plane (110) for complete logic control that includes creating canisters and containers or bypassing canisters and directly creating containers.

To complete the signal path from the control plane (110) toward the trust plane (160), a shorter container (170) with application logic (132) is created and exists on or is embedded in the trust plane (160). The signal path (172) provides for flow and connection between the shorter container (170) and the longer (higher) container (180) which contains application logic (134). A connector path (185) also exists and allows for signals to pass from the control plane (110) and longer canister (140) via an initial signal pathway (144).

There is also a connector path (175) from the control plane to the shorter container (170) and essentially identical signal paths (185, 195) which connect with both the longer (larger, higher) container (180) and the virtual container (190). The signal path (182) either leads signals toward or receives signals from an unsecured environment via a connection (162) and/or connection path that connects the trust plane (160) and/or containers (170,180,190) with either a cloud environment (164), where unsecured data may reside and eventually via a connector path (166) to a computer (167).

Also existing on or in the control plane (110) is a control plane logic canister remover and destroyer (150). Here a signal path (152) is used to connect the canister remover and destroyer (150) to a virtual container (190) via a signal path (195) that is also located at (in or on) the trust plane (160). This represents a communication path for the "end of life" for the virtual container (190) which initially existed as a real container. This entire portion of the schematic representation (150,152, 190, and 195) will disappear at the end of life once the container has been utilized. This also is provided to represent the ephemeral nature and connections associated with software containers as used by software developers today.

Figure 2:
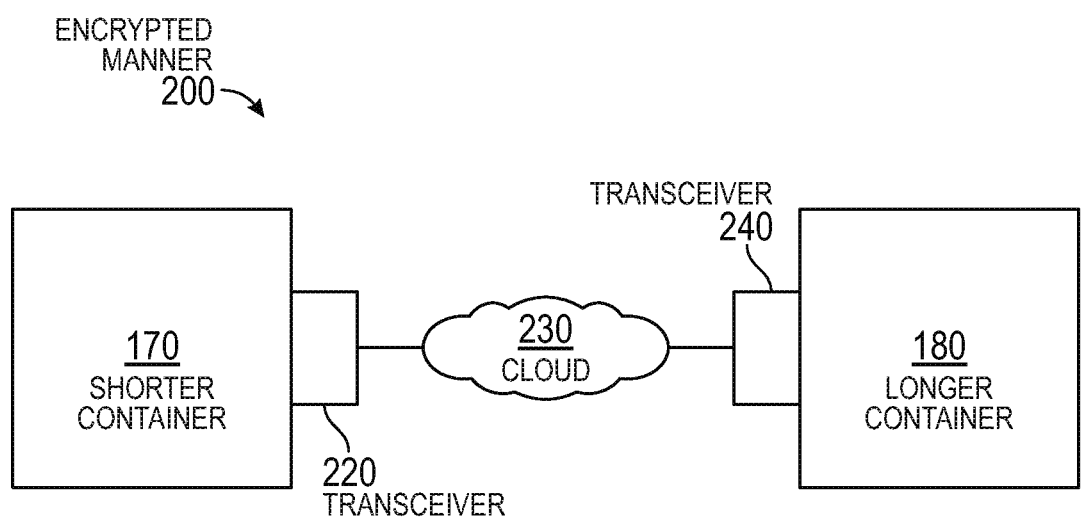
FIG. 2 is a schematic diagram illustrating and representing securitization and encryption of communications using "ICEMicro" between two software containers.

FIG. 2 is a schematic representation of the physical implementation regarding how two (or more) containers can communicate in a secure and optionally encrypted manner (200) residing on a trust plane (160). The first container which was represented as the shorter of the two containers (170) in FIG. 1, resides on a trust plane (160—shown in FIG. 1 only) as also shown in FIG. 1 that both sends and receives signals through a transceiver (220). Likewise, the second container, represented as the taller of the two containers (180) both sends and receives signals through another transceiver (240). Both transceivers are either actually or virtually connected to each of the containers. A cloud computing environment (230) may exists between the two containers (170,180) which will be able to access the cloud (230) as needed via signal transmission (data transmission) via the two transceivers (220,240).

Figure 3:
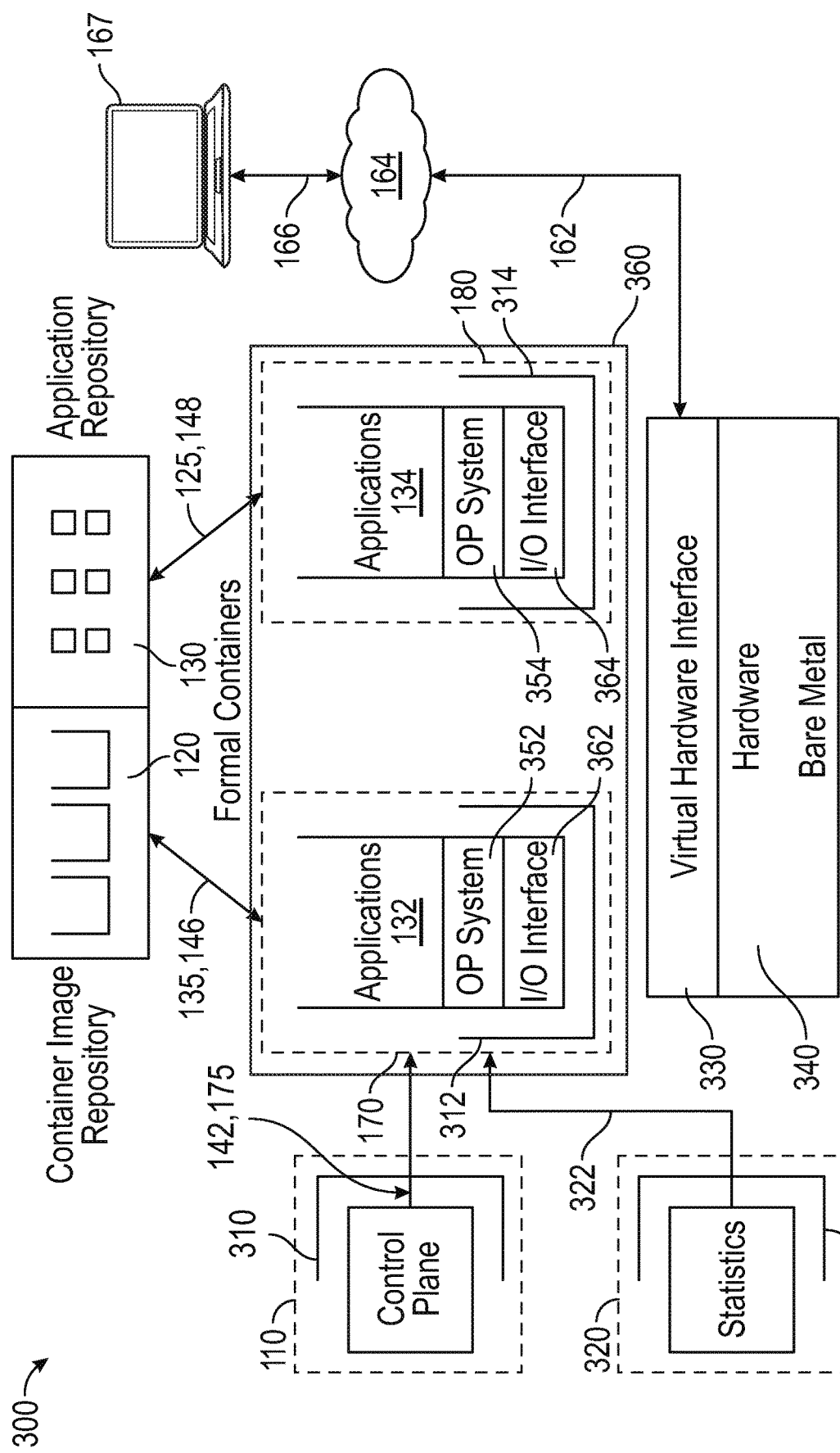
FIG. 3 is a two dimensional detailed schematic overview and flow path associated with the exemplary device and associated "ICEMicro" system shown in FIG. 1.

FIG. 3 is a more detailed two-dimensional version of the managed securitized container device and system (100) schematic shown in FIG. 1 representing most possible signal flow paths for the system. As for FIG. 1, there exists an applications repository (130) and a container repository (120). As in FIG. 1, the full container (170) is shown with a dashed line representing the fabric that comprises the container with the application logic (132) as described above. In addition, dashed lines exist to indicate the entire "fabric" of the ICEMicro securitization employment as shown with (310,312,314) for the control plane (110) and the two containers (170, 180).

Together with the application logic (132) there is also shown and deployed an operating system (352) and an I/O interface (362) to ensure communications with a second container (180) having its own application logic (134), operating system (354), I/O interface (364) so that they can communicate with each other and the cloud (164) and computer (167). There is also included a virtual hardware interface (330) sitting on the actual hardware (bare metal), 340. The system is controlled by a controller residing in or on the control plane (110). In addition, there is a statistics communication processor that allows a software developer the ability to monitor and analyze the system continuously through both the control plane fabric (310) and the statistics communication processor plane (316) and fabric, which collectively is the statistics communications processor (320). The statistics communication processor (320) is connected to the statistics plane (316) via (322) which is the connector from the communications processor (320) to the trust plane (160), which is shown in FIG. 1. All connector lines for FIG. 3 are the same as those described in FIG. 1. Here, however, in FIG. 3, it is necessary to employ the virtual hardware interface (330) and accompanying hardware (340) using a virtual hardware interface that is the hardware visor, and could exist as a virtual hypervisor (shown as 120,130 in FIG. 3—which corresponds with but may not be identical to that shown in FIG. 1). In the case of FIG. 3, the operation of the managed securitized container device and system (100) is now enhanced by the utilization of both the statistics communication processor and either a hyper or real visor device that exists between the repositories (120, 130).

Figure 4:
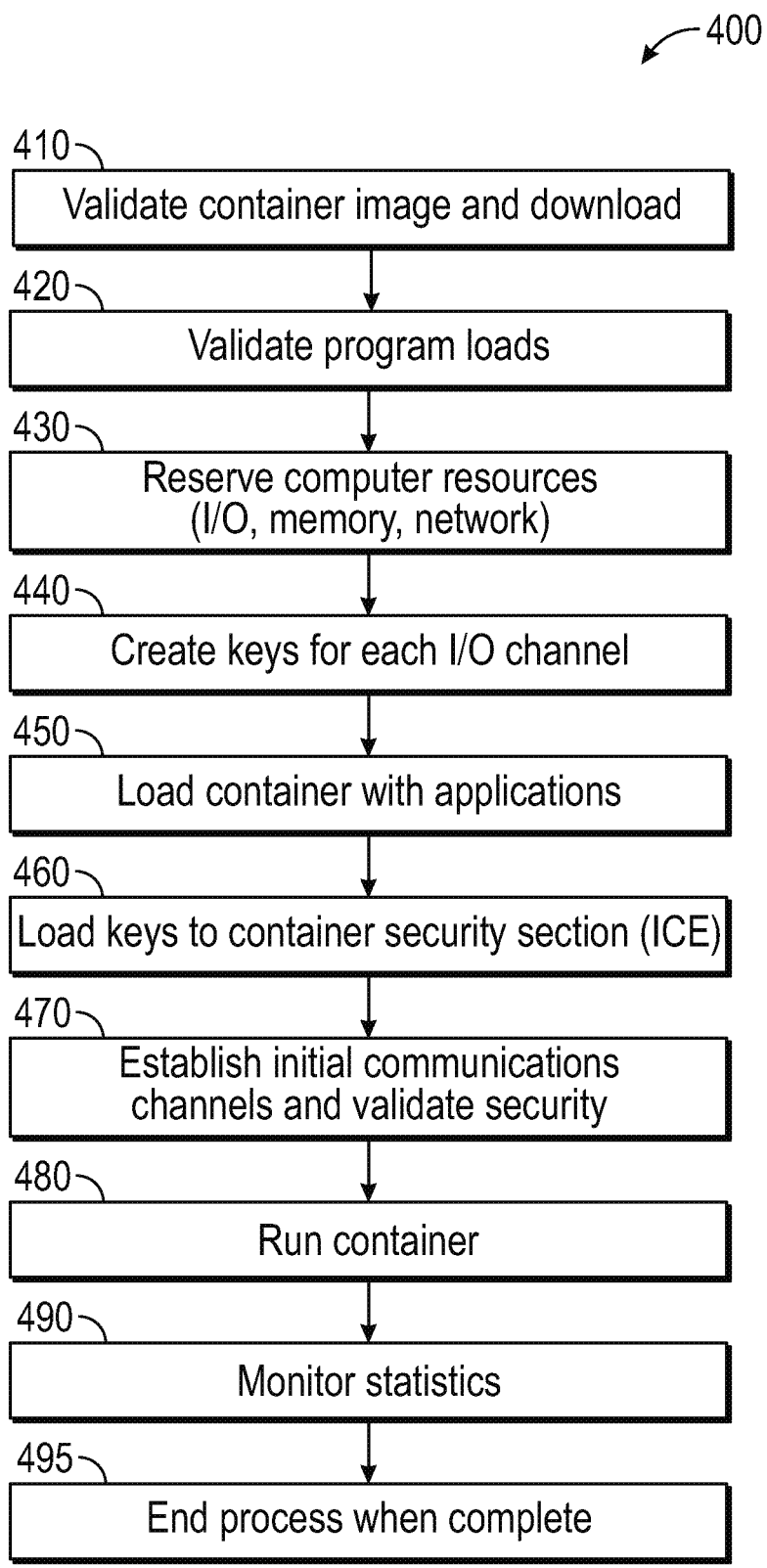
FIG. 4 is a flowchart that indicates the methodology for implementing the "ICEMicro" system for securitizing software containers.

FIG. 4, is a flow diagram that provides one actual methodology associated with using the managed securitized container device and system. In this case, initially the container image is validated and downloaded (410). Next a validated program is loaded (420) which often requires reserve computer resources including I/O—input output—interface(s), a memory, and network capabilities (430). To ensure the encryption is implemented, keys are created for each I/O channel (or tunnel), (440). This provides a transmissions path for loading containers with software applications that are protected by encryption described herewithin (450). Once the keys exist, they can be loaded to the container security portions (known herein as ICEMicro), (460). This leads to establishment of initial communications channels (tunnels) and allows for validation that security has been implemented (470).

Finally, the use of the container is possible and it can be "run" so that its function in developing the software application can be completed (480). As the methodology and system (400) is proceeding, statistics involving all aspects of the system including all securitization and encryption can be monitored (490). This leads to understanding and being notified when the using the managed securitized container device and system has been completed (495).

The availability of such a system allows for stronger security regarding the degree of confidentiality with more confidence. Employing this system further establishes the goal to help encryption systems develop a larger acceptance reputation. Such acceptance provides a consequent increase in usage and a worldwide strengthening of data communications, electronic mail, and commercial electronic transactions.

While most of the foregoing discussion about the present encryption technique has focused on the use of databases, lists and tables for storing transaction specific codes, it may be preferred in some applications having limited memory to provide an algorithm for calculating the next transaction specific code. The concept of "tolerance" described earlier may be incorporated either by setting an acceptable range of values for the transaction specific code (output of the algorithm) or the designated portion itself (input to the algorithm), the latter being the equivalent of back calculating the designated portion and verifying that it is within the range of tolerance.

The computer readable media described within this application is non-transitory. In most if not all cases, the transmission of data is transmitted via signals that are non-transitory signals.

In addition, each and every aspect of all US Provisional and Non-Provisional Applications as well as already granted patents cited above are hereby fully incorporated by reference.

In compliance with the patent laws, the subject matter disclosed herein has been described in language more or less specific as to structural and methodical features. However, the scope of protection sought is to be limited only by the following claims, given their broadest possible interpretations. The claims are not to be limited by the specific features shown and described, as the description above only discloses example embodiments. While the foregoing is directed to preferred embodiments of the present invention, other and further embodiments of the invention may be devised without departing from the basic scope thereof, and the scope thereof is determined by the claims which follow.

I claim:

1. One or more securitized software container management devices, comprising: at least one computer processing unit (CPU) with computational capabilities that is connected to and controls a computer memory via an address bus and a data bus where said address bus accesses a designated range of computer memories and range of memory bits and said data bus provides a flow of transmission(s) into and out of said CPU and computer memory; at least one control plane; at least one trust plane; and at least one software container; wherein controller logic that exists within the control plane transfers signals along a single path to said trust plane or to said software container, or both said trust plane and said software container, wherein said signals further travel through said control plane to said trust plane or said software container, or both said trust plane and said software container, and wherein said signals are securitized or encrypted, or both securitized and encrypted either before, or as, said signals enter said at least one software container;

wherein one or more access devices or one or more user devices, or both one or more access devices and one or more user devices further comprises: at least one computer processing unit (CPU) with computational capabilities that is connected to and controls a computer memory via an address bus and a data bus where said address bus accesses a designated range of computer memories and range of memory bits and said data bus provides a flow of transmission(s) into and out of said CPU and computer memory; one or more real or one or more virtual master distributed auto-synchronous array (DASA) databases or both one or more real and one or more virtual master distributed auto-synchronous array (DASA) databases located within or external to said access devices and said user devices, where said master (DASA) databases at least store and retrieve data and also include at least two or more partial distributed auto-synchronous array (DASA) databases, wherein said partial DASA databases function in either an independent manner, a collaborative manner or both an independent manner and a collaborative manner, wherein said master and said partial DASA databases analyze and provide information in a form of data and act to control one or more output devices, wherein said output devices are computing devices.

2. The one or more securitized software container management devices of claim 1, wherein said one or more output devices create user devices, and wherein said master and said partial DASA databases configure bi-directional transmission of data to and from multiple partial user devices, to and from multiple partial access devices, or to and from both multiple partial user and multiple partial access devices, wherein said user devices and said access devices are computing devices, and wherein one or more partial user and one or more partial access devices store and provide at least partial copies of portions of said master DASA databases, and wherein said master DASA databases, said partial DASA databases, or both said partial DASA databases and said master DASA databases are linked and communicate with each other as well as inclusion of one or more logging and monitoring databases that provide statistical and numerical calculations utilizing data, wherein said one or more access devices authenticate using a first set of computing operations, and validate using a second set of computing operations, and wherein a third set of computing operations controls access for a specified set of users.

3. The one or more securitized software container management devices of claim 1, wherein said at least one software container is connected to said control plane where said signals enter said software container subsequent to an entrance to said control plane, wherein said control plane controller logic accesses one or more software containers and wherein a set of instructions is added to said software containers via one or more application logic repositories and from one or more software container prototype repositories, and;

wherein said at least one software container is connected to said trust plane where said signals enter said software container subsequent to entering said trust plane.

4. The one or more securitized software container management devices of claim 1, wherein said signals are sent directly from said control plane controller logic to said at least one container and wherein signals from said control plane are control plane signals and wherein said signals are sent directly from said trust plane controller logic to said at least one container and wherein signals from said trust plane are trust plane signals.

5. The one or more securitized software container management devices of claim 4, wherein said control plane signals flow through said trust plane or other mechanism that provides trust prior to entrance into said software containers and wherein said control plane includes its own mechanism of trust.

6. The one or more securitized software container management devices of claim 1, wherein said signals are communications signals and wherein said communications signals either contain or themselves are data transmissions, wherein said signals are securitized while said software containers are created, and wherein securitized signals are a mechanism of trust.

7. The one or more securitized software container management devices of claim 1, wherein said signals are securitized for software containers that already exist.

8. The one or more securitized software container management devices of claim 1, wherein said signals are encrypted for software containers that either are created or already exist and wherein encrypted signals are a mechanism of trust.

9. The one or more securitized software container management devices of claim 1, wherein said signals are securitized and encrypted for software containers that either are created or already exist and wherein securitized and encrypted signals are a mechanism of trust.

10. The one or more securitized software container management devices of claim 1, wherein said signals travel through one or more tunnels from said control plane to said trust plane and wherein said signals travel through one or more tunnels from either said control plane or said trust plane or both said control plane and said trust plane into and out of said software containers.

11. The one or more securitized software container management devices of claim 10, wherein said tunnels themselves are securitized and carry securitized transmissions.

12. The one or more securitized software container management devices of claim 10, wherein said tunnels themselves are encrypted and carry encrypted transmissions.

13. The one or more securitized software container management devices of claim 10, wherein said tunnels are both securitized and encrypted and carry both securitized and encrypted transmissions.

14. The one or more securitized software container management devices of claim 10, wherein transmissions are data, voice, or optical transmissions, or wherein said transmissions are data, voice, and optical transmissions, and wherein said signals are comprised of electrical, optical, mechanical, electromagnetic, or radiative energy, or electrical, optical, mechanical, electromagnetic, and radiative energy from an energy source that provides said signal types, and wherein said tunnels are channels through which said signal types travel.

15. The one or more securitized software container management devices of claim 1, wherein said trust plane provides both inter-container and external container connections for signals traveling into and out of said trust plane.

16. The one or more securitized software container management devices of claim 1, wherein said control plane has both inter-container and external container connections for signals traveling into and out of said control plane.

17. The one or more securitized software container management devices of claim 1, wherein said signals into, out of, or within said control plane provide an ability to create, initiate, modify, destroy, and remove said software containers, where said software containers are temporary and obsolete subsequent to deployment.

18. The one or more securitized software container management devices of claim 1, wherein said signals that traverse said control plane are authenticated, verified, or encrypted, or wherein said signals that traverse said control plane are authenticated, verified, and encrypted by said controller logic wherein said controller logic exists either within or external to said control plane.

19. The one or more securitized software container management devices of claim 1, wherein said signals that traverse said trust plane are authenticated, verified or encrypted, or wherein said signals that traverse said trust plane are authenticated, verified and encrypted by controller logic that exists either within or external to said trust plane.

20. The one or more securitized software container management devices of claim 1, wherein said software containers are embedded with secure communications.

21. The one or more securitized software container management devices of claim 1, wherein said software containers operate in a frictionless manner in that scripted control and operation occurs without interruption and wherein originated signals remain intact during operation.

22. The one or more securitized software container management devices of claim 1, wherein said signals carry preprogrammed source code that enables and manages operation of said software containers.

23. The one or more securitized software container management devices of claim 1, wherein said software containers are virtual devices.

24. The one or more securitized software container management devices of claim 1, wherein said software containers include a statistics processor, wherein statistics exist for setup and operational parameters, system resource use, communications connections, volume of data, run time, and external communications monitoring, and wherein said statistics also provide for statistical correlation and autocorrelation to create warnings and alarms for software containers that do not maintain statistical norms in comparison with software containers that are within statistical norms.

25. A method for using one or more securitized software container management devices, comprising: wherein said securitized software container management devices include at least one control plane, at least one trust plane, and at least one software container, wherein a controller that exists within the control plane transfers signals along a single path to said trust plane or to said software container, or both said trust plane and said software container and wherein said signals continue traveling through said control plane to said trust plane or said software container, or both said trust plane and said software container, and wherein said signals are securitized or encrypted, or said signals are securitized and encrypted either before, or as, said signals are entering said at least one software container;

wherein one or more access devices or one or more user devices, or both one or more access devices and one or more user devices with one or more real or one or more virtual master distributed auto-synchronous array (DASA) databases or both one or more real and one or more virtual master distributed auto-synchronous array (DASA) databases located within or external to said access devices and said user devices, wherein said master (DASA) databases at least store and retrieve data and also include at least two or more partial distributed auto-synchronous array (DASA) databases, wherein said partial DASA databases function in either an independent manner, a collaborative manner or both an independent manner and a collaborative manner, wherein said master and said partial DASA databases analyze and provide information in a form of data and act to control one or more output computing devices.

\* \* \* \* \*